(12) United States Patent
Hoffman

(10) Patent No.: US 8,420,007 B2
(45) Date of Patent: Apr. 16, 2013

(54) APPARATUS FOR DIRECT SMELTING OF ZINC BEARING COMPOUNDS TO PRODUCE METALLIC ZINC

(75) Inventor: Glenn E. Hoffman, Lancaster, SC (US)

(73) Assignee: Cardero Resource Corporation, Vancouver, B.C. (CA)

( * ) Notice: Subject to any disclaimer, the term of this patent is extended or adjusted under 35 U.S.C. 154(b) by 0 days.

(21) Appl. No.: 13/200,186

(22) Filed: Sep. 20, 2011

(65) Prior Publication Data
US 2012/0013053 A1   Jan. 19, 2012

Related U.S. Application Data

(63) Continuation of application No. 12/452,849, filed as application No. PCT/US2008/010122 on Aug. 12, 2008, now Pat. No. 8,043,408.

(60) Provisional application No. 60/967,347, filed on Sep. 4, 2007, provisional application No. 60/997,616, filed on Oct. 4, 2007, provisional application No. 61/126,915, filed on May 8, 2008.

(51) Int. Cl.
*C22B 1/14* (2006.01)

(52) U.S. Cl.
USPC ............................ 266/171; 266/200; 266/232

(58) Field of Classification Search .................. 266/171, 266/200, 227, 232
See application file for complete search history.

(56) References Cited

U.S. PATENT DOCUMENTS

| 3,068,091 | A | * | 12/1962 | Kirkland | ........................ 75/474 |
| 5,431,710 | A | * | 7/1995 | Ebenfelt | ........................ 75/443 |
| 6,699,302 | B1 | * | 3/2004 | Jones et al. | ................. 75/10.32 |

* cited by examiner

*Primary Examiner* — Scott Kastler
(74) *Attorney, Agent, or Firm* — Ralph H. Dougherty

(57) ABSTRACT

Apparatus for producing lead and zinc from concentrates of zinc and lead sulfides or oxides, including: a source of zinc ore and/or lead ore concentrates, iron bearing and carbon containing materials; metallic iron fines and iron oxide fines; carbonaceous reductant; fluxing agent; and a binder; a mixer for forming a mixture from said concentrates and other materials; an agglomerator communicating with the mixer for forming agglomerates from the mixture; a melting furnace for melting the mixture and vaporizing lead and zinc; a pressure sealed feed system communicating with the agglomerator and the melting furnace for introducing agglomerates to the melting furnace; a pressure sealed chamber surrounding the melting furnace; a water-cooled condenser for receiving the vaporized metal and cooling and condensing the metal vapors to liquid metal; a tapping device communicating with the condenser for removing the liquid metal; and associated devices for separating the zinc and lead and recovering the lead and zinc metal separately.

6 Claims, 3 Drawing Sheets

APPARATUS FOR DIRECT SMELTING OF ZINC BEARING COMPOUNDS TO PRODUCE METALLIC ZINC

CROSS REFERENCE TO RELATED APPLICATIONS

This application claims the benefit of priority of the following applications:

This application is a divisional application of U.S. patent application Ser. No. 12/452,849 filed Jan. 23, 2010 now U.S. Pat. No. 8,043,480.

PCT Application PCT/US2008/010122 filed: 12 Aug. 2008, U.S. Provisional Patent Application Ser. No. 60/967,347, filed 4 Sep. 2007;

PCT Application PCT\US 2008\010124, filed: 12 Aug. 2008, U.S. Provisional Patent Application Ser. No. 60/997,616, filed: 4 Oct. 2007

PCT Application PCT\US 2008\010123, filed 12 Aug. 2008, and U.S. Provisional Patent Application Ser. No. 61/126,915, filed 8 May 2008.

FIELD OF THE INVENTION

The present invention relates to a method and apparatus for producing metallic zinc or lead by direct smelting of zinc or lead bearing compounds which generally incorporate zinc and/or lead in sulfide and/or oxide form (ZnS and/or ZnO, PbS and/or PbO) therein.

SUMMARY OF THE INVENTION

Zinc bearing compounds, principally ZnS or $ZnSO_4$, but also ZnO and materials containing zinc oxide, such as electric arc furnace dust (EAFD), are cold briquetted to form compact agglomerates containing a carbonaceous material such as coal, coke, petcoke, char, etc., iron oxide (either already contained in the ore or added separately as iron ore fines, mill scale, metalized iron fines, etc., to the mix), fluxes such as lime, silica, spar, etc., and binder. An excess amount of carbon is present in the agglomerate, not only to react with the zinc compounds, but also to reduce the iron oxide, manganese oxide, lead oxide, cadmium oxide, etc., so that the melter atmosphere is predominantly CO with some liberated $H_2$ from the volatilization of the coal. The oxygen contained in the iron oxide is free to react with the zinc sulfide to form ZnO, or the zinc sulfide can sublime upon reaching high temperatures to liberate zinc vapor. Sulfur in the system is free to combine with the liquid iron to form liquid FeS or dissolved sulfur in iron.

OBJECTS OF THE INVENTION

The principal object of the present invention is to provide an effective method and apparatus for recovering zinc and lead from concentrates of sulfides and oxides.

Another object of the invention is to provide a means for producing all the required electricity to accommodate the process and operate the plant in such manner as to be electricity self sufficient.

BRIEF DESCRIPTION OF THE DRAWINGS

The foregoing and other objects will become more readily apparent by referring to the following detailed description and the appended drawing, in which.

Figure 1:
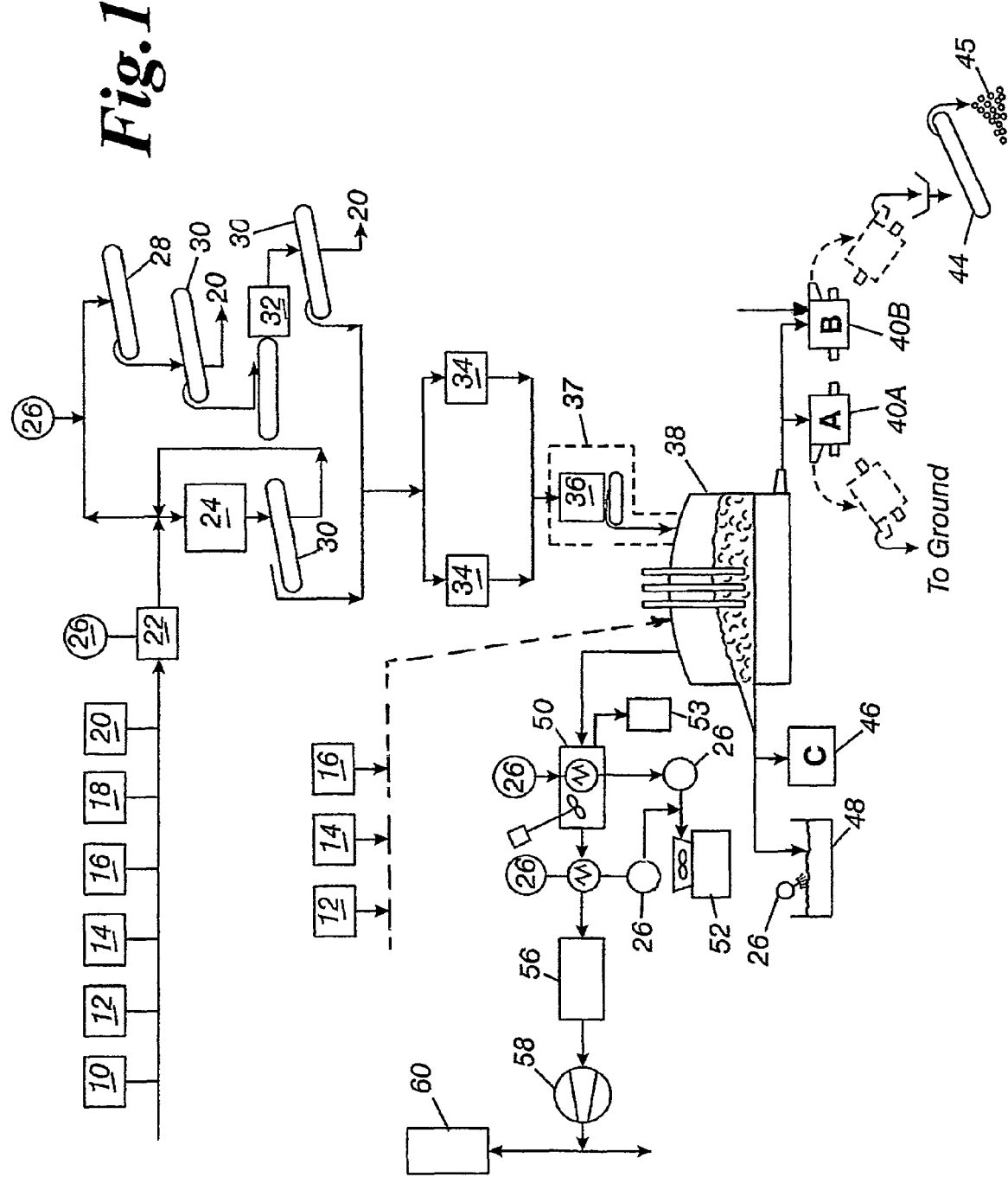
FIG. 1 is a schematic flowsheet of the process for recovering zinc and lead from concentrates of sulfides and oxides according to the invention.
Figure 2:
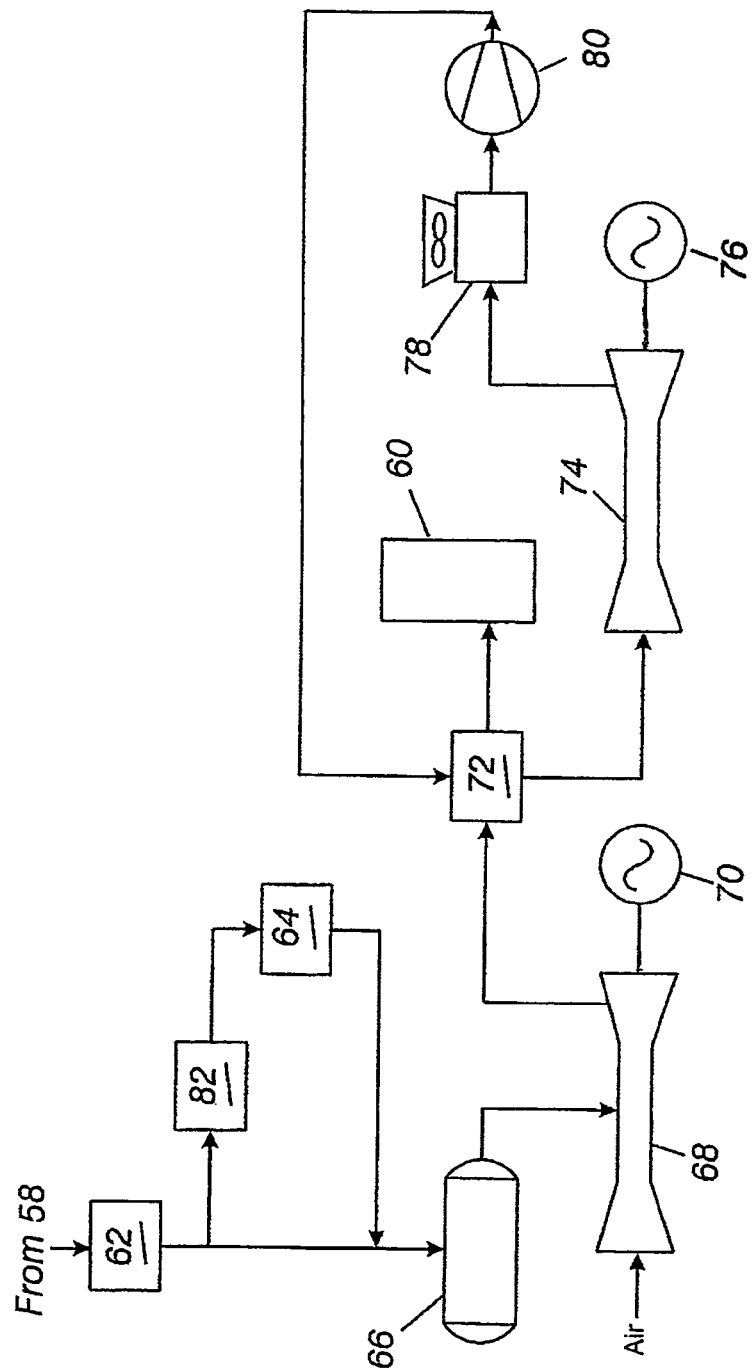
FIG. 2 is a schematic flowsheet for producing electricity from the off-gases from the invented process.
Figure 3:
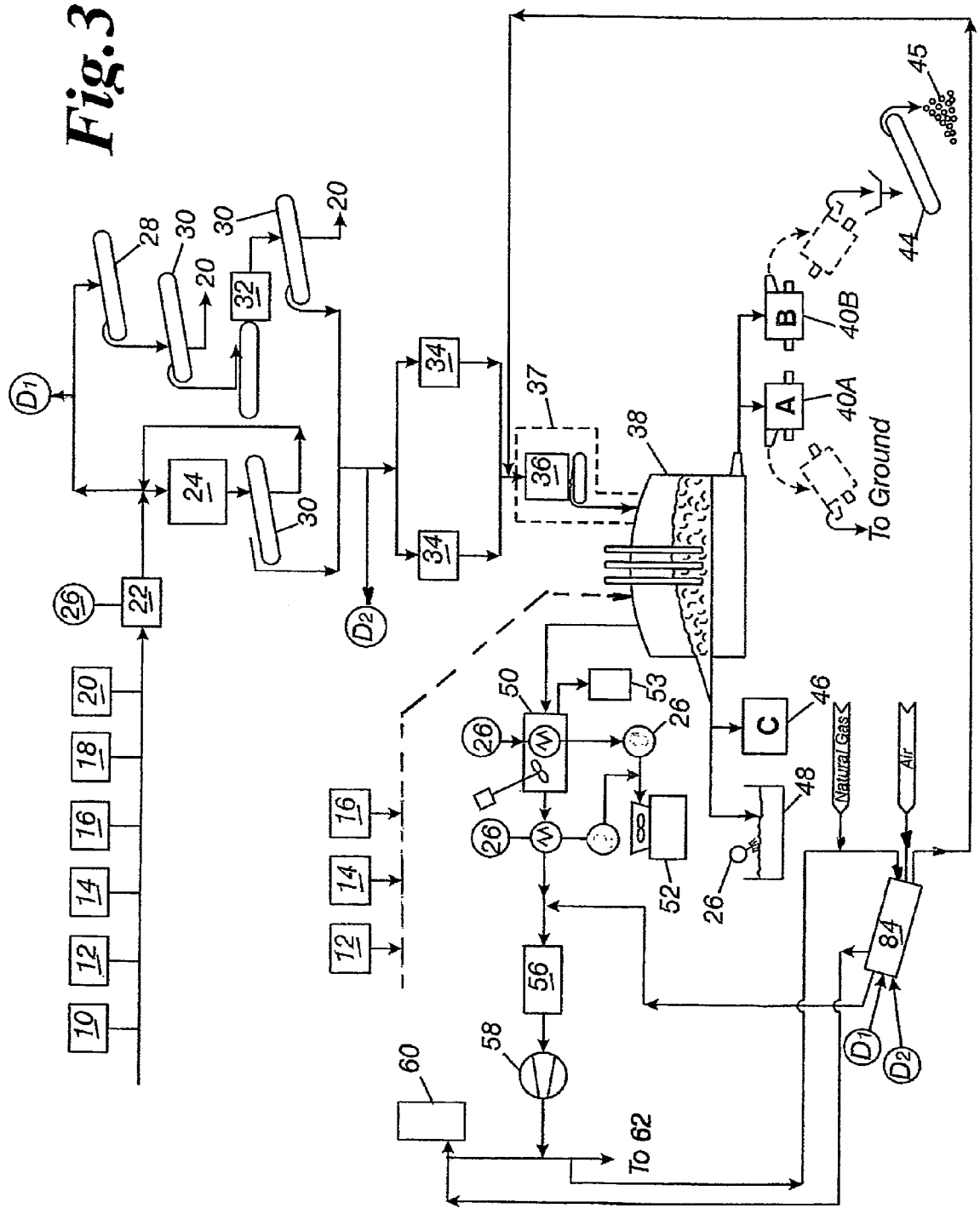
FIG. 3 is a schematic flowsheet showing an alternative method for recovering zinc and lead in which feed materials are preheated with or without agglomeration, then fed to the melting furnace.

The reference numerals in the figures refer to the following items:

| | |
|---|---|
| 10 | lead ore and/or zinc ore concentrate - 100% passing 10 mesh Tyler Standard (1.70 mm), preferably 100% passing 100 mesh Tyler Standard (150 microns) |
| 12 | metallic iron fines, and iron oxide fines - 100% minus 25 mm, preferably 100% passing 10 mesh |
| 14 | prepared reductant, such as coal, coke, petroleum coke, char, etc., 100% passing 25 mm, preferably 100% passing 100 mesh Tyler Standard (150 microns) |
| 16 | fluxing agents - CaO, MgO, $CaF_2$, $Al_2O_3$, $SiO_2$, etc - 100% minus 25 mm |
| 18 | binder such as cellulose, bentonite, molasses, starch - either organic or inorganic |
| 20 | recycled fines |
| 22 | mixer |
| 24 | briquetter/agglomerator (size 8 to 100 cc) |
| 26 | water addition |
| 28 | pelletizer - drum or disc type |
| 30 | screens - dry or roller type |
| 32 | greenball dryer (dries pellets to 1% moisture or less) |
| 34 | agglomerate (briquette) curing/storage hoppers |
| 36 | feed loss in weight system |
| 37 | pressure sealed chamber |
| 38 | electric melting furnace or melter >1000 C. |
| 40 | ladle(s) for liquid iron and iron sulfide |
| 42 | slag addition for desulfurization |
| 44 | pig iron caster |
| 45 | pig iron |
| 46 | slag ladle |
| 48 | slag disposal/quench bunker |
| 50 | melter off gas zinc and lead liquid condenser, water cooled |
| 52 | cooling tower |
| 53 | tapping ladle |
| 54 | offgas indirect cooling exchanger |
| 56 | offgas cooling scrubber/bag filter |
| 58 | fan |
| 60 | stack with combustion to convert CO & $H_2$ to $CO_2$ & $H_2O$ |
| 62 | high pressure compressor (300-350 psig) |
| 64 | optional gas stream, sulfur removal system, such as Selexol |
| 66 | high pressure gas accumulator tank |
| 68 | gas turbine ( exit gas temp 600-700 C.) |
| 70 | generator |
| 72 | waste heat boiler heat exchanger |
| 74 | high pressure steam turbine |
| 76 | generator |
| 78 | boiler closed circuit water conduit |
| 80 | pump |
| 82 | optional chiller upstream of gas sulfur removal system |
| 84 | heater, direct or indirect rotary kiln type |

DETAILED DESCRIPTION

Zinc ores appear in sulfide or sulfide and oxide form. Virtually all zinc smelting operations are predicated on first roasting the ore to liberate $SO_2/SO_3$ and convert ZnS to ZnO which is then reduced to produce Zn vapor, which vapor is then condensed by lowering the temperature of the smelter offgas. Also, the smelter is operated so that the iron units are tapped out as quality pig iron, which necessitates certain restraints on operation. In many cases the $SO_2/SO_3$ is recovered as $H_2SO_4$ that is used to leach the primary ore. I have made thermodynamic calculations examining the various processing routes and have discovered that if processing is oriented at direct smelting the ZnS in an electric melter that has a strongly reducing environment created by feeding agglomerates that contain carbon (e.g., coal or other solid carbon) and keeping the melter sealed against air ingress, then a different approach to zinc recovery can be taken.

In the present invention, the agglomerates also include some iron oxide and slag flux agents (CaO and MgO). During the course of heating in the melter, the ZnS is converted to Zn vapor directly or to ZnO and then reduced to Zn vapor. The source of oxygen to make ZnO is provided by the reduction of the iron oxide ($Fe_2O_3$->FeO), and it is the FeO that reacts with the zinc sulfide. The zinc vapor is condensed from the exhaust gas by using conventional condenser technology, and the liberated sulfur is tied up primarily by the liquid Fe in the form of liquid FeS or reacts with the CaO to form CaS, and is kept in the liquid state as FeS or slag. There is so little iron required in the invented process that recovering of pig iron is not important, instead liquid FeS is tapped. The zinc recovery drives the process economics.

As seen in FIG. 1, feed materials are introduced to mixer 22, the input materials consisting of: lead ore and/or zinc ore concentrates 10, 100% of which pass 10 mesh Tyler Standard (1.70 mm), preferably 100% of which pass 100 mesh, Tyler Standard (150 microns); metallic iron fines and iron oxide fines 12, 100% of which are minus 25 mm, preferably at least 50% of which pass 10 mesh; prepared reductant 14, such as coal, petroleum coke, char, or other carbonaceous material, 100% of which are minus 25 mm, preferably 100% of which pass 10 mesh Tyler Standard (1.70 mm); slag formers or fluxing agents 16, such as MgO, CaO, $Al_2O_3$, $CaF_2$ (fluorspar) and $SiO_2$, 100% of which are minus 25 mm; an organic or inorganic binder 18, such as cellulose, bentonite, molasses, or starch; recycled fines 20, and water 26 as needed.

These materials are mixed in mixer 22, then formed into agglomerates in briquetter/agglomerator 24, or in pelletizer 28 (such as a drum or disc type pelletizer), the agglomerates being in the form of uniformly sized briquettes or pellets, preferably about 8 cc to 100 cc in size. The agglomerates are screened by sizer 30, such as a dry screen or a roller type screen, the undersized material being returned to the agglomerator 24 or to the mixer 22.

Screened pellets from pelletizer 28 are dried in a greenball dryer 32 to 1% or less moisture content. The agglomerates are cured and/or stored in hoppers 34, then fed into an electric melting furnace 38 through a pressure-sealed feed system 36, similar to a feed leg of a shaft furnace, or through lock valves. The temperature of the electric furnace melter is maintained in a sufficiently high range that it forms vaporized lead and zinc, which is removed as off gas, and condensed in condenser 50. The melter operating temperature is in the range of from 100 C to 1650 C, preferably in the range of 1200 C to 1550 C. The electric furnace melter 38 operates normally under a slight positive pressure. The lead and zinc are tapped from the condenser 50. Difference in densities of liquid metals, particularly lead and zinc, allows the heavier (more dense) lead to be tapped first from a settling pot of the condenser 50, followed by tapping of the lighter zinc to a tapping ladle 53. This is done on an intermittent basis.

A mixture of iron and iron sulfide is removed from the melter into ladles 40 and may be cast into pigs 45 at pig caster 44, as shown.

Alternatively, material D1 exiting mixer 22 can be fed to a heater 84 for the purpose of preheating the mixture to about 500 to 1200 C, devolatizing the reductant, and producing a preheated charge to electric furnace melter 38. Pre-reduction of the iron oxide will occur to levels ranging from about 0 to 90%. Agglomerated material D2 can also be preheated, if desired, prior to feeding the material to the melter through the pressure seal 37. The heater 84 can be an indirectly heated rotary kiln, or a direct fired kiln, as shown, with off-gases being recycled. The heater 84 can be refractory lined, or it can be unlined, as desired.

Optionally one or more additional feed materials may be introduced through a pressure seal directly to the melter 38 as shown by dotted lines in FIG. 1, such additional materials being selected from a group including metallic iron fines and iron oxide fines 12, 100% of which are minus 25 mm, preferably minus 10 mesh; prepared reductant 14, such as coal, petroleum coke, or other carbonaceous material, 100% of which are minus 25 mm, preferably 100% of which pass 10 mesh, Tyler Standard (1.70 mm), and slag formers or fluxing agents 16, such as MgO, CaO, $Al_2O_3$, $CaF_2$ (fluorspar) and $SiO_2$, 100% of which are minus 25 mm.

The operating parameters of the invented process are as follows:

|  | Normal Range | Maximum |
| --- | --- | --- |
| Lead Zinc Melter | 1200-1550 C. | 1650 C. |
| Melter Off-Gas | 500-1500 C. | 1200-1650 C. |
| Off-Gas from Zn—Pb Condenser | 300-700 C. | <900 C. |
| Melter Off-Gas Pressure | 0-0.2" $H_2O$ gauge | <15" $H_2O$ gauge |
| Gas Accumulator Off-Gas Pressure | 100-350 psig |  |
| Gas Turbine Combined Product Exit Temp. | 750-900 C. | <1000 C. |

Offgas exiting the condenser 50 is cleaned in a cooler/scrubber 56, which may include a bag filter, moved by fan 58 and compressed in high pressure compressor 62 and used as combustion fuel in gas turbine 68. Gas turbine 68 drives generator 70 to produce electricity, and sensible heat contained in offgas exiting the gas turbine is recovered in a waste heat recovery boiler system 72. The waste heat boiler system 72 steam cycle could be a "Kalina" cycle based on using 70% ammonia and 30% water for better range processing and heat recovery efficiency at lower gas temperatures. Ammonia/water boiling occurs over a range of temperatures rather than at a specific temperature and pressure. Steam produced by the waste heat boiler system 72 is then used to drive a steam turbine 74 and generator 76 to produce additional electricity. One of the prime objectives that is realized by the invention is to produce all the required electricity to accommodate the process and operate the plant so as to be electricity self sufficient.

Waste off-gas from everywhere in the process is combusted in stack 60 to convert carbon monoxide and hydrogen to carbon dioxide and water vapor.

Gas from the compressor 58 can be treated for sulfur removal in an optional sulfur removal system 64, which may require an optional chiller 82 upstream of the sulfur gas removal system.

SUMMARY OF THE ACHIEVEMENT OF THE OBJECTS OF THE INVENTION

From the foregoing, it is readily apparent that I have invented an improved method and apparatus for recovering zinc and lead from concentrates of sulfides and oxides more effectively than heretofore.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. Apparatus for produciug lead and zinc from concentrates of zinc and lead sulfides or oxides, consisting of.
   (a) a source of zinc ore and/or lead ore concentrates, iron bearing and carbon containing materials; metallic iron fines arid iron oxide fines; carbonaceous fluxing agent; and a binder;
   (b) a mixer for forming a mixture from said concentrates and other materials;
   (c) means communicating with said, mixer for forming agglomerates from said mixture;
   (d) a melting furnace;
   (e) a pressure sealed feed system communicating with said agglomerating means and said melting furnace for introducing said agglomerates to said melting furnace;
   (f) a pressure sealed chamber surrounding said melting furnace;
   (g) means for maintaining a reducing atmosphere within said melting furnace;
   (h) means for vaporizing lead and zinc in the melting furnace;
   (I) means for removing the lead and zinc from the melting furnace in vaporized form;
   (j) Water-cooled condenser means for cooling and condensing the metal, vapors to liquid metal;
   (k) tapping means communicating with said condenser for removing the liquid metal;
   (l) means for separating the zinc and lead and recovering the lead and zinc metal separately;
   (m) a cooler-scrubber communicating with said melting furnace for cleaning and cooling the off-gases removed from said melting furnace;
   (n) a gas turbine communicating with said cooler-scrubber for receiving and utilizing the cleaned and cooled off-gases as combustion fuel; and
   (o) a generator associated with and, driven by said gas turbine.

2. Apparatus according to claim 1, wherein the means for forming agglomerates is a pelletizer, briquetter, or agglomerator.

3. Apparatus according to claim 1, wherein the means for separating the zinc and lead and recovering the lead and zinc metal separately includes a settling pot associated with said condenser, said settling pot having zinc tapping means directed to a zinc tapping ladle.

4. Apparatus for producing lead and zinc from concentrates of zinc and lead sulfides or oxides, consisting of:
   (a) a source of zinc ore and/or lead ore concentrates, iron bearing and carbon containing materials; metallic iron fines and iron oxide fines; carbonaceous reductant; fluxing agent; and a binder;
   (b) a mixer for forming a mixture from said concentrates and other materials;
   (c) means communicating with said mixer for forming agglomerates from said mixture;
   (d) a melting furnace;
   (e) a heater communicating with said mixer for preheating the mixture and producing a preheated charge to said melting furnace;
   (f) a pressure sealed feed system communicating with said agglomerating means and said melting furnace for introducing said agglomerates to said melting furnace;
   (g) a pressure sealed chamber surrounding said melting furnace;
   (h) means for maintaining, a reducing atmosphere within said melting furnace;
   (i) means for vaporizing lead and zinc in the melting furnace;
   (j) means for removing the lead and zinc from the melting furnace in vaporized form;
   (k) water-cooled condenser means for cooling and condensing the metal vapors to liquid metal;
   (l) tapping means communicating with said condenser for removing the liquid metal;
   (m) means for separating the zinc and lead and recovering the lead and zinc metal separately;
   (n) a cooler-scrubber communicating with said melting furnace for cleaning and cooling the off-gases removed from said melting furnace;
   (o) a gas turbine communicating with said cooler-scrubber for receiving and utilizing the cleaned and cooled off-gases as combustion fuel; and
   (p) a generator associated with and driven by said gas turbine.

5. Apparatus for producing lead and zinc from concentrates of zinc and lead sulfides or oxides, consisting of:
   (a) a source of zinc ore and/or lead ore concentrates, iron bearing and carbon containing materials; metallic iron fines and iron oxide fines; carbonaceous reductant; fluxing agent; and a binder;
   (b) a mixer for forming a mixture from said concentrates and other materials;
   (c) means communicating with said mixer for forming agglomerates from said mixture;
   (d) a melting furnace;
   (e) a pressure sealed feed system communicating with said agglomerating means and said melting furnace for introducing said agglomerates to said melting furnace;
   (f) a pressure sealed chamber surrounding said melting furnace;
   (g) means for maintaining a reducing atmosphere within said melting furnace;
   (h) means for vaporizing lead and zinc in the melting furnace;
   (I) means for removing the lead and zinc from the melting furnace in vaporized form;
   (j) water-cooled condenser means for cooling and condensing the metal vapors to liquid metal;
   (k) tapping means communicating with said condenser for removing the liquid metal;
   (l) means for separating the zinc and lead and recovering the lead and zinc metal separately;
   (m) a cooler-scrubber communicating with said melting furnace for cleaning and cooling the off-gases removed from said melting furnace;
   (n) a gas turbine communicating with said cooler-scrubber for receiving and utilizing the cleaned and cooled off-gases as combustion fuel;
   (o) a generator associated with and driven by said gas turbine; and
   (p) a waste heat boiler associated with said gas turbine for recovering the sensible heat contained in off-gas exiting said gas turbine, and producing steam.

6. Apparatus for producing lead and zinc from concentrates of zinc and lead sulfides or oxides, consisting of:

(a) a source of zinc ore and/or lead ore concentrates, iron bearing and carbon containing materials; metallic iron flues and iron oxide fines; carbonaceous reductant; fluxing agent; and a binder;
(b) a mixer for forming a mixture from said concentrates and other materials;
(c) means communicating with said mixer for forming agglomerates from said mixture;
(d) a melting furnace;
(e) a pressure sealed feed system communicating with said agglomerating means and said melting furnace for introducing said agglomerates to said melting furnace;
(f) a pressure sealed chamber surrounding said melting furnace;
(g) means for maintaining a reducing atmosphere within said melting furnace;
(h) means for vaporizing lead and zinc in the melting furnace;
(I) means for removing the lead and zinc from the melting furnace in vaporized form;
(j) water-cooled condenser means for cooling and condensing the metal vapors to liquid metal;
(k) tapping means communicating with said condenser for removing the liquid metal;
(l) means for separating the zinc and lead and recovering the lead and zinc metal separately;
(m) a cooler-scrubber communicating with said melting furnace for cleaning and cooling the off gases removed from said melting furnace;
(n) a gas turbine communicating with said cooler-scrubber for receiving and utilizing the cleaned and cooled off-gases as combustion fuel;
(o) a generator associated with and driven by said gas turbine;
(p) a waste heat boiler associated with said gas turbine for recovering the sensible heat contained in off-gas exiting said gas turbine, and producing steam;
(q) a steam turbine associated with said waste heat boiler adapted to be driven by the steam from said waste heat boiler, and an associated generator adapted to be driven by said steam turbine for producing additional electricity.

* * * * *